United States Patent [11] 3,545,639

[72] Inventors Richard J. Charles;
 Paul J. Jorgensen, Schenectady, New York
[21] Appl. No. 500,350
[22] Filed Oct. 21, 1968
[45] Patented Dec. 8, 1970
[73] Assignee General Electric Company
 a corporation of New York

[54] CERAMIC-METAL BONDING COMPOSITION AND COMPOSITE ARTICLE OF MANUFACTURE
 12 Claims, No Drawings
[52] U.S. Cl. .................................................. 220/2.3,
 106/39, 106/47
[51] Int. Cl. ....................................... H01j 61/36;
 C03c 3/30
[50] Field of Search .......................................... 106/47, 39,
 39(DVC); 313/220, 221; 220/2.3

[56] References Cited
UNITED STATES PATENTS
3,281,309 10/1966 Ross ............................ 106/39(X)
3,338,694 8/1967 Davy ............................ 106/47(X)
3,022,179 2/1962 Morrissey ..................... 106/39(DVC)

*Primary Examiner*—Tobias E. Levow
*Assistant Examiner*—J. Cooper
*Attorneys*—Richard R. Brainard, Charles T. Watts, Richard A. Speer, Melvin M. Goldenberg, Frank L. Neuhauser and Oscar B. Waddell ABSTRACT: Glass bonding compositions consisting of barium oxide, calcia, magnesia and alumina are disclosed. These compositions are useful in the construction of alkali metal vapor lamps.

CERAMIC-METAL BONDING COMPOSITION AND COMPOSITE ARTICLE OF MANUFACTURE

This invention relates to sealing compositions and more particularly to a glass-sealing composition of particular value in bonding ceramic-ceramic and ceramic-refractory metal bodies together.

A similar composition for the same purpose is set forth in U.S. Pat. application Ser. No. 388,567 now abandoned, filed Aug. 10, 1964, by one of the two present inventors, and having a common assignee.

It has been found that the composition set forth in the above-identified application may be improved to provide for a reduction in the gas evolution, bubble formation during manufacture, cracking and chemical interaction with sodium metal when the composition is used in Sodium Lucalox lamps. The improvement has been attained by modifying the composition in the manner set forth below.

It is the principal object of the present invention to provide a glass bonding or sealing composition which is useful to temperatures higher than those at which existing bonding compositions may be used. An additional object of this invention is to provide a glass bonding composition which is effective in bonding to high density polycrystalline ceramic bodies constructed of alumina.

A further object of this invention is to provide a glass sealing composition which withstands attack by alkali metal vapors.

Another object of this invention is to provide substantially pure alumina bodies having a bonding glass joined thereto.

Further objects and advantages of this invention will be in part obvious and in part explained below.

Generally, the present invention is concerned with a sealing glass which is useful at temperatures in the vicinity of about 850° C. and which will withstand attack by alkali metal vapors at these temperatures. The composition can be used either for bonding ceramics to other ceramics or for bonding ceramics to refractory metal bodies.

The composition of the glass is improved as to its chemical stability and there has been produced a finer grain structure on devitrification by partially substituting BaO for calcia. The compositions that are useful are as follows by weight:

| | Percent |
|---|---|
| Barium oxide | 1.0–10.0 |
| Calcia | 28.5–37.5 |
| Magnesia | 5.5–9.5 |
| Alumina | 52.0–56.0 |

The percentage range of alumina allows maintaining the melting point at 1500° C., if desired.

The present glass composition is extremely useful in the production of electric discharge devices and lamps constructed of high density polycrystalline translucent alumina ceramic. This material and the basic method for preparing it are described and claimed in U.S. Pat. No. 3,026,210, Robert L. Coble, issued Mar. 20, 1962, and assigned to the same assignee as the present invention. The polycrystalline alumina bodies described in the Coble patent consist of at least 99.5 percent alumina and are very dense, having essentially no porosity. For this reason, the material is extremely well-suited for use in the manufacture of lamp envelopes. Additionally envelopes constructed of the high density polycrystalline alumina withstand attach by the vapors of the alkali metals at high operating pressures and temperatures and can, therefore, be used in the construction of lamps such as sodium and cesium vapor lamps. Of course, in order to have a practical and useful lamp, it is necessary to be able to tightly seal the structure and it is with this sealing problem that the present invention is directly concerned.

In accordance with this invention, there is provided a bond between ceramic parts or between a ceramic part and a refractory metal part by means of a high temperature sealing-glass made up of four metallic oxides. The composition is one which experiences a peritectic decomposition during cooling and very quickly crystallizes at an eutectic producing an extremely fine-grained ceramic seal. A specific composition that is very satisfactory is:

| | Percent |
|---|---|
| Barium oxide | 1.9 |
| Calcia | 36.6 |
| Magnesia | 7.5 |
| Alumina | 54.0 |

The composition has a melting point of about 1525° C. This composition can be used to bond bodies constructed of the high density alumina of Coble to bodies of the same composition or can be used to bond refractory metal seals to the alumina bodies.

The particular metal frequently used in the articles involved has been generally niobium, however, other refractory metals may be used such as tungsten, molybdenum, tantalum and zirconium, etc. The particular metal selected will depend upon the ambient contained in the tube or such other similar article in which the seal is formed.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

We claim:

1. A glass composition for use in bonding high density polycrystalline bodies, said glass consisting essentially of the following proportions by weight:

| | Percent |
|---|---|
| Barium oxide | 1.0–10.0 |
| Magnesia | 5.5–9.5 |
| Calcia | 28.5–37.5 |
| Alumina | 52.0–56.0 |

2. A glass composition for use in bonding high density polycrystalline bodies, said glass comprising about the following proportions by weight:

| | Percent |
|---|---|
| Barium oxide | 1.9 |
| Magnesia | 7.5 |
| Calcia | 36.6 |
| Alumina | 54.0 |

3. An article of manufacture, a high density polycrystalline body comprising about 99.5 weight percent alumina and a glass composition bonded thereto having about the following proportions by weight:

| | Percent |
|---|---|
| Barium oxide | 1.0–10.0 |
| Magnesia | 5.5–9.5 |
| Calcia | 28.5–37.5 |
| Alumina | 52.0–56.0 |

4. As an article of manufacture, a high density polycrystalline body comprising about 99.5 weight percent alumina and a glass composition bonded thereto having about the following proportions by weight:

| | Percent |
|---|---|
| Barium oxide | 1.9 |
| Magnesia | 7.5 |
| Calcia | 36.6 |
| Alumina | 54.0 |

5. As an article of manufacture, a high density polycrystalline body comprising about 99.5 weight percent alumina, a refractory metal body, and a glass bonding said refractory metal body to said high density alumina body, said glass having about the following proportions by weight:

| | Percent |
|---|---|
| Barium oxide | 1.0–10.0 |
| Magnesia | 5.5–9.5 |
| Calcia | 28.5–37.5 |
| Alumina | 52.0–56.0 |

6. An article of manufacture as defined in claim 5 wherein said refractory metal is from the group consisting of niobium, tantalum, tungsten, molybdenum and zirconium.

7. As an article of manufacture, a high density polycrystalline body comprising about 99.5 weight percent alumina, a refractory metal body, and a glass bonding said refractory metal body to said high density alumina body, said glass having about the following proportions by weight:

| | Percent |
|---|---|
| Barium oxide | 1.9 |
| Magnesia | 7.5 |
| Calcia | 36.6 |
| Alumina | 54.0 |

8. An article of manufacture as defined in claim 7 wherein said refractory metal is from the group consisting of niobium, tantalum, tungsten, molybdenum and zirconium.

9. A vapor lamp comprising an envelope in the form of a tube constructed of a high density polycrystalline body comprising about 99.5 weight percent alumina, a refractory metal end seal for closing the end of said tube and a glass bonding said metal end seal to said polycrystalline alumina tube, said glass having about the following proportions by weight:

| | Percent |
|---|---|
| Barium oxide | 1.0–10.0 |
| Magnesia | 5.5–9.5 |
| Calcia | 28.5–38.5 |
| Alumina | 52.0–56.0 |

10. A vapor lamp as defined in claim 9 wherein the said glass has the following proportions by weight:

| | Percent |
|---|---|
| Barium oxide | 1.9 |
| Magnesia | 7.5 |
| Calcia | 36.6 |
| Alumina | 54.0 |

11. A vapor lamp as defined in claim 9 wherein said refractory metal end seal is formed from a metal of the group consisting of niobium, tantalum, tungsten, molybdenum and zirconium.

12. A vapor lamp as defined in claim 10 wherein said refractory metal end seal is formed from a metal of the group consisting of niobium, tantalum, tungsten, molybdenum and zirconium.